(12) United States Patent
Choi et al.

(10) Patent No.: US 8,779,936 B2
(45) Date of Patent: Jul. 15, 2014

(54) METHOD AND SYSTEM FOR PROVIDING SAFETY GUIDANCE SERVICE

(75) Inventors: Jeong Dan Choi, Daejeon (KR); Sung Won Sohn, Daejeon (KR); Jong-Hyun Park, Daejeon (KR); Ju Wan Kim, Daejeon (KR); Seong Ik Cho, Daejeon (KR); Byung Tae Jang, Daejeon (KR); Do Hyun Kim, Daejeon (KR); Kyoung Hwan An, Daejeon (KR); Jungsook Kim, Daejeon (KR); Kyung Bok Sung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 800 days.

(21) Appl. No.: 12/909,391

(22) Filed: Oct. 21, 2010

(65) Prior Publication Data

US 2011/0095904 A1 Apr. 28, 2011

(30) Foreign Application Priority Data

Oct. 22, 2009 (KR) .................. 10-2009-0100551
May 31, 2010 (KR) .................. 10-2010-0051209

(51) Int. Cl.
| | | |
|---|---|---|
| G08G 1/005 | (2006.01) | |
| G08G 1/16 | (2006.01) | |
| H04L 29/06 | (2006.01) | |
| H04L 29/08 | (2006.01) | |
| G08G 1/00 | (2006.01) | |
| G08G 1/0962 | (2006.01) | |
| G08G 1/0965 | (2006.01) | |
| G08G 1/01 | (2006.01) | |
| H04M 1/725 | (2006.01) | |

(52) U.S. Cl.
CPC .................. *G08G 1/005* (2013.01); *G08G 1/00* (2013.01); *G08G 1/0962* (2013.01); *G08G 1/0965* (2013.01); *G08G 1/164* (2013.01); *G08G 1/0104* (2013.01); *G08G 1/16* (2013.01); *G08G 1/166* (2013.01); *H04M 1/72572* (2013.01); *H04M 2250/10* (2013.01); *H04M 2250/12* (2013.01)
USPC .. 340/901; 340/905; 340/539.11; 340/539.22

(58) Field of Classification Search
None
See application file for complete search history.

(56) References Cited

U.S. PATENT DOCUMENTS

| | | | | |
|---|---|---|---|---|
| 6,405,128 | B1 * | 6/2002 | Bechtolsheim et al. ...... | 701/431 |
| 7,382,276 | B2 * | 6/2008 | Boss et al. ................... | 340/905 |
| 7,432,826 | B2 * | 10/2008 | Schwartz ...................... | 340/902 |
| 8,427,341 | B2 * | 4/2013 | Yulevich ....................... | 340/905 |
| 8,461,976 | B2 * | 6/2013 | Yamamoto et al. .......... | 340/436 |
| 2003/0073406 | A1 * | 4/2003 | Benjamin et al. ............ | 455/41 |

(Continued)

FOREIGN PATENT DOCUMENTS

| | | |
|---|---|---|
| JP | 2002-74584 | 3/2002 |
| JP | 2002-90172 | 3/2002 |

(Continued)

*Primary Examiner* — Julie Lieu
(74) *Attorney, Agent, or Firm* — Staas & Halsey LLP

(57) ABSTRACT

A method for providing a safety guidance service from a local server to a nomadic device includes gathering information regarding surrounding conditions within a service area on a road, receiving device information from the nomadic device, which enters the service area, determining whether or not the nomadic device is placed in a situation based on the device information, and when it is recognized that the situation has happened, providing safety guidance message suitable to the situation to the nomadic device.

17 Claims, 9 Drawing Sheets

(56) References Cited

U.S. PATENT DOCUMENTS

| | | | |
|---|---|---|---|
| 2004/0196161 A1* | 10/2004 | Bell et al. | 340/905 |
| 2005/0248469 A1* | 11/2005 | DeKock et al. | 340/905 |
| 2007/0008173 A1* | 1/2007 | Schwartz | 340/902 |
| 2007/0159354 A1* | 7/2007 | Rosenberg | 340/902 |
| 2007/0276600 A1* | 11/2007 | King et al. | 701/301 |
| 2009/0174572 A1* | 7/2009 | Smith | 340/902 |
| 2009/0256911 A1* | 10/2009 | Hakki et al. | 348/149 |
| 2010/0020169 A1* | 1/2010 | Jang et al. | 348/115 |
| 2010/0164753 A1* | 7/2010 | Free | 340/932 |
| 2012/0139755 A1* | 6/2012 | Ginsberg | 340/905 |

FOREIGN PATENT DOCUMENTS

| | | |
|---|---|---|
| JP | 2004-199283 | 7/2004 |
| KR | 10-2001-0061772 | 7/2001 |
| KR | 10-2006-0063616 | 6/2006 |

* cited by examiner

FIG.7

| CONTROL COMMAND | SITUATION | PARAMETER |
|---|---|---|
| 1 | ENTRY NOTIFICATION | ID OF TERMINAL WHICH HAS TRANSMITTED ENTRY NOTIFICATION MESSAGE |
| 2 | ACKNOWLEDGEMENT | N/A (NO PERTINENT DATA) |
| 3 | START TRANSMISSION OF USECASE INSTANCE | N/A (NO PERTINENT DATA) |
| 4 | TRANSMISSION OF CONTENT OF USECASE INSTANCE | CONTENT OF METADATA |
| 5 | TERMINATE TRANSMISSION OF USECASE INSTANCE | N/A (NO PERTINENT DATA) |

FIG.10

| MESSAGE NO. | CONTENT | MESSAGE INSTANCE |
|---|---|---|
| 1 | RISKY FACTYOR WARNING | TRAFFIC SIGNAL IS CHANGED, ATTENTION PLEASE |
| 2 | RISKY FACTYOR WARNING | YOU PASSEED RED LIGHT IN ENTERING INTERSECTION, ATTENTION PLEASE |
| 3 | RISKY FACTYOR WARNING | YOU ILLEGALLY ENTERED INTERSECTION CURENTLY |
| 4 | RISKY FACTYOR WARNING | POSSIBILITY OF TAILGATING |
| 5 | RISKY FACTYOR WARNING | POSSIBILITY OF REAR-END COLLSION, ATTENTION PLEASE |
| 6 | RISKY FACTYOR WARNING | INTERSECTION, ATTENTION PLEASE |
| 7 | RISKY FACTOR NOTIFICATION | TRAFFIC SIGNAL-VIOLATED VEHICLE APPEARS, ATETNTION PLEASE |
| 8 | RISKY FACTOR NOTIFICATION | THERE IS A VIOLATED VEHICLE IN INTERSECTION, ATTENTION PLEASE |
| 9 | RISKY FACTOR NOTIFICATION | THERE IS A VEHICLE RUNNING IN INTERSECTION, ATTENTION PLEASE |
| 10 | RISKY FACTOR RELEASE | RISKY SITUATION IS RELEASED |
| 11 | PARKING SPOT CHECK GUIDANCE | GUIDE YOU TO XX AREA |
| 12 | PARKING SPOT CHECK GUIDANCE | THERE IS NO PARKING SPOT. PLEASE GO TO A DIFFERENT PARKING LOT |
| 13 | PARKING ROUTE GUIDANCE | PARKING ROUTE GUIDANCE (ADDITIONAL) |

METHOD AND SYSTEM FOR PROVIDING SAFETY GUIDANCE SERVICE

CROSS-REFERENCE(S) TO RELATED APPLICATION(S)

The present invention claims priority of Korean Patent Application Nos. 10-2009-0100551 and 10-2010-0051209, filed on Oct. 22, 2009 and May 31, 2010, which are incorporated herein by reference.

FIELD OF THE INVENTION

The present invention relates to a technique for preventing driving and walking safety accidents from occurring on a road and, more particularly, to a method and system of providing a safety guidance service for a safety accident prevention to nomadic devices within a service area on a road.

BACKGROUND OF THE INVENTION

Car crashes at intersections may be caused by a vehicle located in an area where a visual field does not reach or a vehicle that violates a traffic signal in the intersection. Moreover, when a vehicle cannot stop before it enters an intersection because of its high speed, when a vehicle starts upon prediction, or when a vehicle enters a congested intersection, the vehicle aggravates a road traffic condition to increase the possibility of an accident.

Recently, a system in which a sensor network is installed in an intersection to discriminate the speed of a vehicle or catch a vehicle that violates a traffic signal is used, but a service that delivers information regarding a situation around the vehicle to a driver before an accident happens has not yet been used.

Also, the Korea Location Protocol (KLP) in Korea, the Mobile Location Protocol (MLP) in other countries, etc., have been proposed as service protocols for receiving a location-based service, and Open Location Service (OpenLS), which is location-based service architecture, has also been proposed. In Korea, 'Hi-pass' system employing communication between a vehicle and a roadside infrastructure, has been commercialized and has been used as a part of an Electronic Toll Collection (ETC) system.

According to the related arts, in order for a mobile terminal to receive a particular location-based service, the particular programs for the service must be installed in the mobile terminal in advance, which may lead the mobile terminal to become heavy owing a limited resource of the mobile terminal and take a long time to execute the service properly. In addition, communication techniques between vehicles and communication techniques between a vehicle and a roadside base station have been actively developed, but there is no any application-stage protocol regarding a travelling direction of a vehicle and parking guidance through communication between a vehicle and the roadside base station and a consideration of an application for a travelling and stop guidance.

GTP1.0, a telematics protocol proposed by European Telematics Implementation Coordination Organization (ERTICO), defines a detailed message standard of an application layer in which a header includes a definition of a service type to manage a detailed standard of detailed messages. Also, it provides a Usecase for each service and a sequence of a message transmission in the Usecase.

SUMMARY OF THE INVENTION

Therefore, present invention provides a method for providing a safety guidance service to nomadic devices within a service area on a road.

In accordance with a first aspect of the present invention, there is provided a method for providing a safety guidance service from a local server to a nomadic device, which includes:

gathering information regarding surrounding conditions within a service area on a road;

receiving device information from the nomadic device, which enters the service area;

determining whether or not the nomadic device is placed in a situation based on the device information; and when it is recognized that the situation has happened, providing a safety guidance message suitable to the situation to the nomadic device.

In accordance with a second aspect of the present invention, there is provided a local server for providing a safety guidance service to a nomadic device, which includes:

an information gathering unit for gathering information regarding surrounding conditions within a service area on a road;

a device information gathering unit for gathering device information of the nomadic device that enters the service area;

an information database for storing the surrounding condition information and the device information of the nomadic device; and a situation determining unit for determining whether or not the nomadic device is placed in a situation based on the device information and when it is recognized that the situation has happened, providing a safety guidance message suitable to the situation to the nomadic device with reference to the surrounding condition information.

In accordance with a third aspect of the present invention, there is provided a system for providing a safety guidance service, which includes:

a plurality of sensor nodes, each sensor node is installed in a service area on a road and acquires information about surrounding conditions within the service area;

a nomadic device for providing device information thereof when entering the service area; and a local server for gathering the surrounding condition information and receiving the device information from the nomadic device, determining whether or not a situation happens based on the device information and when it is recognized that the situation has happened, transmitting a safety guidance message suitable to the situation to the nomadic device with reference to the surrounding condition information.

BRIEF DESCRIPTION OF THE DRAWINGS

The above and other objects and features of the present invention will become apparent from the following description of embodiments, given in conjunction with the accompanying drawings, in which:

FIG. 7 represents Control Commands in accordance with an embodiment of the present invention;

FIG. 10 shows an exemplary table of safety guidance service messages being transmitted from the local server to the nomadic devices in accordance with an embodiment of the present invention.

DETAILED DESCRIPTION OF THE EMBODIMENTS

Hereinafter, embodiments of the present invention will be described in detail with the accompanying drawings, which form a part thereof.

Figure 1:
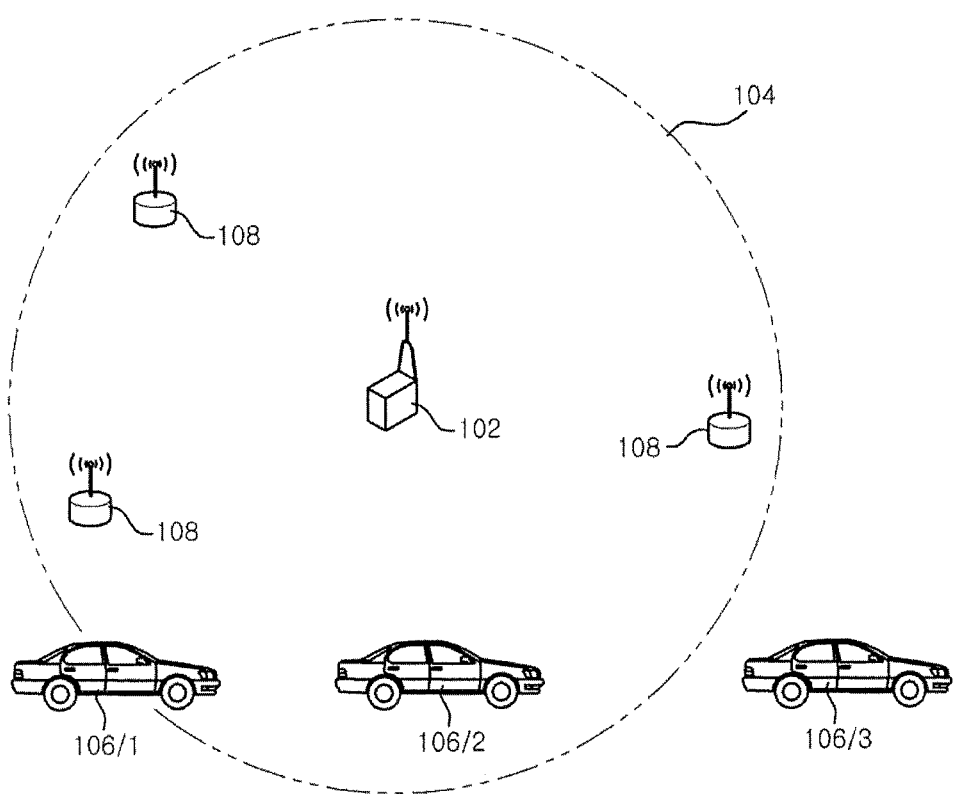
FIG. 1 is a system for providing a safety guidance service to nomadic devices within a service area on a road in accordance with an embodiment of the present invention.

FIG. 1 is a system for providing a safety guidance service to nomadic devices within a service area on a road. The system includes a local server 102, a plurality of sensor nodes 108 and a plurality of nomadic devices 106/1 to 106/3. The service area 104 may be an area where drivers desire to safely drive their vehicles, for example, an intersection zone, a traffic light zone, a parking-spot zone and the like.

The sensor nodes 108 are installed in the service area 104 covered by the local server 102 and perform wireless or wired communication with the local server 102. Each of the sensor nodes may include an infrastructure sensor such as a CCD camera, an ultrasonic sensor, a geo-magnetic sensor, and the like. The respective sensor nodes 108 acquires information about surrounding conditions such as a road condition, a traffic condition, a parking-spot condition and the like within the service area 104 and transmit the gathered road condition information to the local server 102.

The nomadic devices 106/1, 106/2 and 106/3 may be vehicle-mounted terminals or pedestrian-carried terminals. In the present embodiment, it is assumed that the nomadic devices are vehicle-mounted terminals, for the convenience of explanation. Therefore, though the nomadic devices are illustrated in the form of vehicles in FIG. 1, it is noted that they are merely illustrated to indicate vehicle-mounted terminals and actually refer to nomadic devices mounted in vehicles. For example, a first nomadic device 106/1 may refer to a vehicle-mounted terminal that is just entering the service area 104, a second nomadic device 106/2 may refer to a vehicle-mounted terminal which has already entered the service area 104, and a third nomadic device 106/3 may refer to a vehicle-mounted terminal which is out of the service area 104. Such a nomadic device may further includes, but is not limited to, a navigation device, mobile telephone, a smart phone, a personal digital assistant (PDA), a hand-held personal computer (PC), a notebook PC, and the like, which is capable of communicating with the local server 102.

The nomadic devices 106/1, 106/2 and 106/3 attempt a wireless connection to the local server 102 at a preset period. When a nomadic device is placed in a situation, for example, when the nomadic device is located at the intersection zone, the traffic light zone or the parking-spot zone within the service area 104, the nomadic device is provided with a safety guidance service from the local server 102. To do it, the nomadic device gathers device information and transmits the gathered device information to the local server 102. The device information may be a terminal ID, a current location, a driving speed, and a travelling direction. In case where the nomadic device is a vehicle-mounted device, the terminal ID may refers to the terminal ID of the nomadic device, the current location, the driving speed and the traveling direction may refer to the current position, the driving speed and the traveling direction of the vehicle equipped with the nomadic device.

The local server 102 collects the surrounding condition information from the sensor nodes 108 and the device information from the nomadic devices within the service area 104. The local server 102 recognizes the situation of the nomadic device based on the device information to provide the safety guidance message suitable to the situation of the nomadic device with reference to the surrounding condition information.

The safety guidance message may include a message related to intersection guidance, traffic signal guidance, parking spot guidance, and the like, as illustrated in FIG. 10. Alternatively, another types of message may also includes those illustrated in FIG. 10.

More specifically, when a nomadic device (e.g., 106/1) enters the service area 104, it transmits an entry notification message including the terminal ID and the current location thereof to the local server 102. Upon receiving the entry notification message, the local server 102 checks the terminal ID, and when the terminal ID is founded to be a valid terminal ID, the local server 102 registers the nomadic device 106/1 in a client list, and provides an acknowledgement message to the nomadic device 106/1 along with metadata. Simultaneously, the local server 102 transmits metadata including Usecases of the local server 102 to the nomadic device 106/1.

The user terminal, which has entered the service area 104, interprets the metadata and exchanges data frames with the local server 102 in accordance with the sequence described the metadata. Therefore, the nomadic device 106/1 exchanges a request frame and a data frame with the local server 102. This is performed in a manner that the local server 102 generates the request frame and transmits it to the nomadic device 106/1, and the nomadic device 106/1 generates the data frame and transmits it to the local server 102 in response, through which the nomadic device 106/1 can be provided with the safety guidance service from the local server 102.

In addition, when no message from the nomadic device 106/1 has been received for a certain time period, the local server 102 recognizes that the nomadic device 106/1 is out of the service area 104, releases its connection with the nomadic device 106/1, and deletes the nomadic device 106/1 from the client list.

In brief, in the system in accordance with the present invention, when the respective nomadic device are placed in the situation within the service area 104, the local server 102 notifies the safety guidance message of all the nomadic devices within the service area 104, thus providing the safety guidance service to the nomadic devices.

The nomadic device generally has a limited system resource and thus a light application is required for the nomadic device. Accordingly, the nomadic device does not retain SGP Meta with respect to every service Usecases but receives a Usecase instance of a local server when the nomadic device enters a service area of the local server.

In other words, when the nomadic device enters the service area of the local server, the nomadic device transmits the entry notification message to the local server.

Upon receipt of the entry notification message, the local server checks a terminal ID, and when the terminal ID is found to be a valid terminal ID, the local server registers the nomadic device in the client list. After that, the local server transmits an acknowledgement message and then transmits the metadata. The metadata used herein includes Usecases of the local server, so the nomadic device can interpret the metadata and communicates with the local server while exchanging data frames depending on the sequence described in the metadata. During the exchange of data, the local server transmits message such as a warning message, matters that require attention, or the like, to the nomadic device. In this case, the warning message, the matters that require attention, or the like, is not defined in the metadata.

In accordance with the invention, in order to express a Usecase in a machine readable format, the Usecase is expressed by using an extensible markup language (XML), and a document type definition (DTD) is used for describing the Usecase. The reason why both the XML and the DTD are used to describe the Usecase is that the DTD limits the structure of an XML document and the name of an element that appears in the document.

The Usecase in terms of protocol includes two components as follows: one is a set of messages exchanged through the Usecase, and the other is a message transmission sequence between the nomadic device and the local server. A message may be created by combining primitive data for a safety guidance service. For example, it is assuming that the nomadic device transmits an entry notification message to the local server when it enters the service area of the local server. In this case, the entry notification message is created by combining primitive data elements such as a terminal ID, a current location, a driving speed, and the like.

Therefore, the protocol proposed by the present invention defines a scheme for expressing a set of messages and a transmission sequence of the messages by using XML, and primitive data elements for configuring the message. The Usecase expressed in an XML format is parsed by the nomadic device and the local server. The message transmission sequence parsed in the Usecase is then used for checking whether or not the message transmission is performed to be valid depending on the protocol and the message set in the Usecase is then used as a template for configuring the message. Namely, the message in the Usecase expresses the types and numbers of primitive data_elements to be included in the message, which facilitate to configure the message to be actually transmitted by the nomadic device or the local server through the use of gathered data from the sensor nodes and the nomadic devices. In this case, it is preferable to configure the actually transmitted message in a binary format by using the XML message template in consideration of the communication cost.

Figure 5:
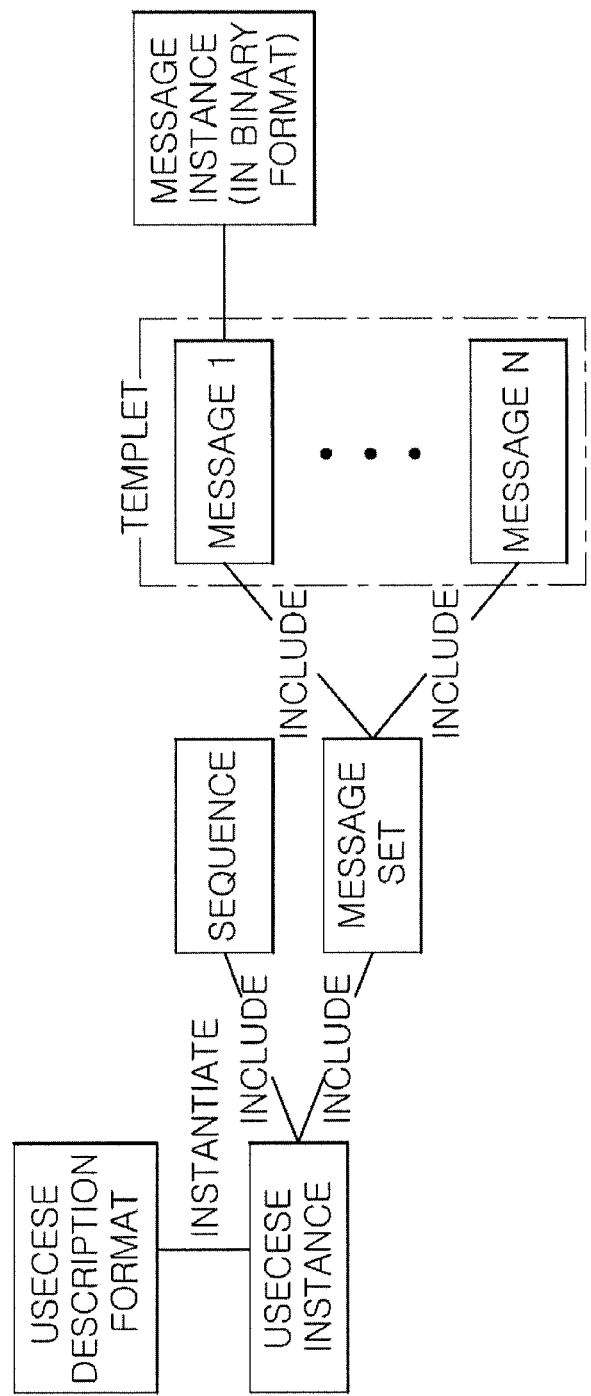
FIG. 5 depicts a structure of a protocol for a safety guidance service and connections between protocol components in accordance with an embodiment of the present invention.

FIG. 5 is an exemplified protocol structure showing relation between a protocol structure and protocol elements in accordance with an embodiment of the present invention, the functions of which will be described below.

Usecase Description Format (UDF)

It refers to a means including restrictions for describing a Usecase, which is created through an XML DTD. The UDF provides a method for defining the name of a Usecase, a method for defining a message transmission sequence of the Usecase, and a method for defining messages used in the Usecase.

Usecase Instance

It is created as an XML written document and must satisfy the UDF. In case of a valid Usecase, the Usecase Instance is interpreted by an XML parser in the local server and the nomadic device. The parsed Usecase Instance allows the nomadic device and the local server to exchange messages of a corresponding Usecase.

Sequence

It refers to a message transmission sequence, which is one of elements of the Usecase.

Message Set

It refers to an overall message used for each Usecase. Each message of a message set serves as a template as to which core elements make up each message for the transmission by the nomadic device or the local server is made up with.

Message Instance

It refers to a message actually transmitted by the nomadic device or the local server. The nomadic device or the local server recognizes required core elements through a message template, combines gathered data to generate the Message Instance corresponding to the template. In this case, the Message Instance is configured in a binary format for the efficiency of communication.

Next, actual examples of types of primitive data used to configure information exchanged between the local server and the nomadic device will be described below.

Terminal ID

It indicates information such as the identifier for identifying each nomadic device.

Message ID

It is information used for encoding messages.

The Message ID indicates which data the currently transmitted message is made up of.

Timestamp

It indicates a time at which a message to be exchanged is transmitted. Timestamp may be indicated as seconds which have lapsed starting from midnight of Jan. 1, 1970 (UNIX epoch time).

Location

It is data indicating a geographical location of the nomadic device at a particular time.

Speed

It indicates a moving speed of the vehicle (or pedestrian) carrying the nomadic device at a particular time.

Direction

It indicates a direction in which the nomadic device is headed for at a particular time.

Figure 6:
FIG. 6 presents a protocol message format in accordance with an embodiment of the present invention.

FIG. 6 illustrates a protocol message format in accordance with an embodiment of the present invention. Elements configuring a message are defined as follows.

In FIG. 6, an MSG length indicates the length of a message transmitted one time, which is equivalent to the sum of control command and terminal ID, excluding the MSG length.

Control Command describes how to control protocol progress and is indicated as a number corresponding to each situation.

Parameter Size indicates the length of a parameter which varies depending on the Control Command.

FIG. 7 illustrates Control Commands described in FIG. 6. An entry notification message is a message the nomadic device transmits to the local server when the nomadic device mounted in the vehicle or carried by a pedestrian enters the service area of the local server.

Upon receipt of the entry notification message, the local server transmits an acknowledgement message to the nomadic device, and then transmits the metadata. The metadata used herein describes information required for exchanging a data frame and a request frame. The metadata is described in an XML format, and a DTD of an XML written document is as follows.

TABLE 1

```
<!ELEMENT Protocol (Usecase, DataFrameSet)>
<!ELEMENT Usecase (Name, Sequence)>
<!ELEMENT Sequence ((ServerSend | ClientSend)*)>
<!ELEMENT Name (#PCDATA)>
<!ELEMENT ServerSend (#PCDATA)>
<!ELEMENT ClientSend (#PCDATA)>
<!ELEMENT DataFrameSet (DataFrame+)>
<!ELEMENT DataFrame (Name, Type+)>
<!ELEMENT Type (#PCDATA)>
<!ATTLIST Usecase id CDATA #REQUIRED>
<!ATTLIST ServerSend Frame_id CDATA #REQUIRED>
<!ATTLIST ServerSend Continuous CDATA #REQUIRED>
<!ATTLIST ClientSend Frame_id CDATA #REQUIRED>
<!ATTLIST DataFrame Frame_id CDATA #REQUIRED>
<!ATTLIST Type form CDATA #REQUIRED>
```

Elements and attributes stated in Table 1 are described as follows.

Protocol

It indicates the start of the overall content of metadata.

Usecase

It indicates an ID for a Usecase corresponding to each situation of local server.

Sequence

It indicates the course of a data frame sequence.

Name

It designates the name of a data frame of the Usecase.

ServerSend

It indicates a frame used when the local server transmits data or a message to the nomadic device, which has an attribute including an ID of the message sequence and Continuous.

ClientSend

It is a tag name used when the local server transmits requested data or message. Like ServerSend, it has an attribute including an ID of the message sequence and Continuous.

DataFrameSet

It is a set of data frames.

DataFrame

It is the start of a definition of a data frame.

Type

It specifies the type of a data element.

Usecase Id

It specifies an ID of a Usecase.

ServerSend Frame_id

It specifies an ID of a data frame requested by the local server to the nomadic device.

ServerSend Continuous

It specifies as to continuity of data requested by the local server to the nomadic device. When the value of ServerSend Continuous is false, the nomadic device transmits a data frame one time, and when the value is true, the nomadic device continuously transmits data frames as long as the nomadic device is within the service area of the local server.

ClientSend Frame_id

It specifies an ID of a Data Frame transmitted by the nomadic device to the local server.

DataFrame Frame_id

It specifies an ID of a defined Data Frame.

Type Form

It specifies a data element type.

Figure 8:
FIG. 8 depicts a format of a Request Frame in accordance with an embodiment of the present invention.

FIG. 8 illustrates a format of a Request Frame in accordance with an embodiment of the present invention. Elements constituting the Request Frame are defined as follows.

Request Frame is transmitted when the local server requests required information to the nomadic device.

MSG length indicates the sum of all the lengths of the elements excluding the MSG length.

Frame ID is an ID of the Request Frame which is distinguishable from that of Data Frame.

Requested Frame ID is an ID of which data frame is requested to the nomadic device.

Period is information indicating at which intervals a data frame is to be transmitted. When the value of Period is zero, the nomadic device transmits a data frame only one time, and when the value is not zero, the nomadic device transmits the frame in units of milliseconds (ms).

Figure 9:
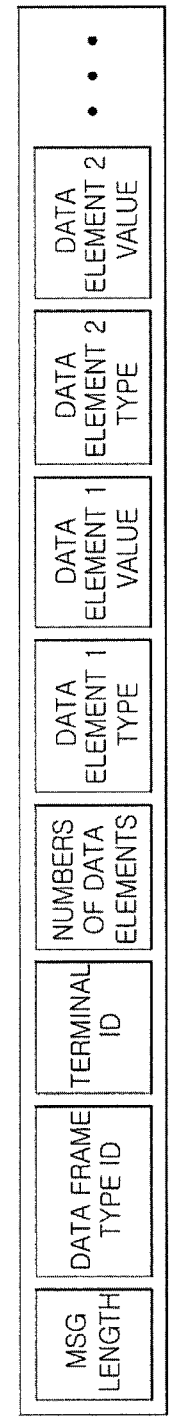
FIG. 9 offers a format of a Data Frame in accordance with an embodiment of the present invention.

FIG. 9 illustrates a format of Data Frame in accordance with an embodiment of the present invention. Elements constituting the Data Frame are defined as follows.

As described above, when the local server transmits Request Frame to a nomadic device, the nomadic device transmits a Data Frame in response to the local server, which is based on the sequence of the metadata.

In FIG. 9, MSG length is the sum of overall lengths of the elements excluding the MSG length.

Data Frame Type (DFT) ID indicates a unique ID of Data Frame for determining the type and quantity of data elements included in the Data Frame.

Terminal ID is an ID of a nomadic device mounted in the vehicle or carried by a pedestrian.

Data Element Number indicates the number of data elements included in Data Frame.

Data Element Type is a primitive data type gathered from a nomadic device mounted in the vehicle or carried by a pedestrian.

Data Element Value is a value which corresponds to a Data element type.

Based on the relation between the structure of the protocol and the elements thereof stated above, the system for providing a safety guidance service in accordance with the present invention will be described with reference to FIGS. 2 and 3.

Figure 2:
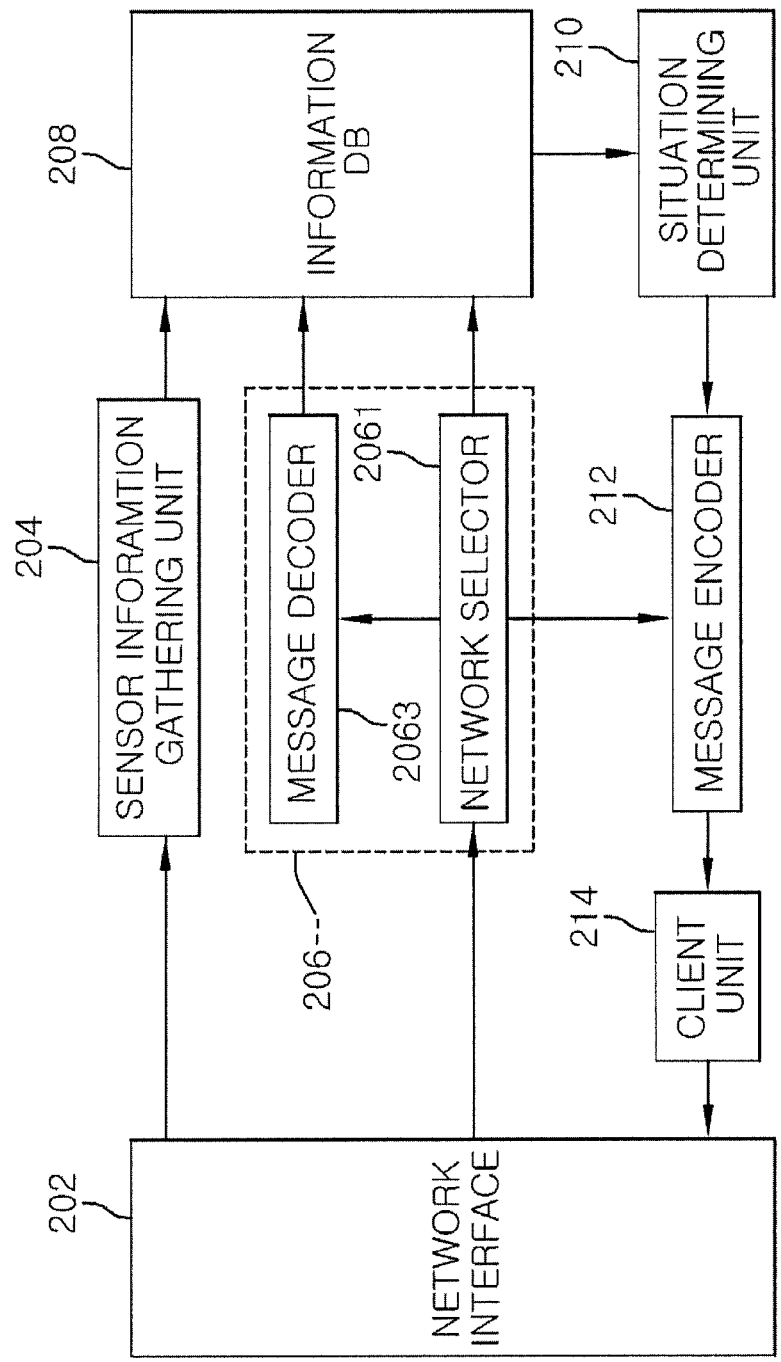
FIG. 2 shows a detailed block diagram of the server shown in FIG. 1 in accordance with an embodiment of the present invention.

FIG. 2 illustrates a block diagram of the local server shown in FIG. 1. The local server 102 includes a network interface 202, a sensor information gathering unit 204, a device information gathering unit 206, an information DB 208, a situation determining unit 210, a message encoder 212, and a client unit 214. The device information gathering unit 206 includes a network selector 2061 and a message decoder 2063.

The network interface 202 interfaces data between the local server 102, and the sensor nodes 108 and a nomadic device within a service area 104. More specifically, the network interface 202 serves to deliver road condition information regarding, e.g., a road/vehicle condition, an intersection condition, a traffic light condition, a parking spot condition, etc. within the service area 104 received from the sensor nodes 108 to the sensor information gathering unit 204, to deliver an entry notification message, a data frame, and the like received from the nomadic device which has entered the service area 104 to the device information gathering unit 206, and to wirelessly transmit an acknowledgement message, metadata including a Usecase of the local server 102, a request frame, a safety guidance message, and the like, to the nomadic device 106/2.

Here, the Usecase in the metadata is described by using XML and DTD, and, the data frame is information transmitted by the nomadic device in response to the request frame transmitted by the local server. The request frame, the data frame and the safety guidance message may be a binary format by using, for example, an XML message template.

The sensor information gathering unit 204 serves to gather information about surrounding road conditions acquired by the sensor nodes 108 within the service area 104 to store the gathered road condition information in the information DB 208.

When the entry notification message is delivered from the network interface 202, the network selector 2061 in the device information gathering unit 206 searches the information DB 208 to recognize whether or not the terminal ID included in the entry notification message is a valid terminal ID. When the terminal ID is recognized to be a valid terminal ID, the network selector 2061 recognizes the nomadic device as a served device. The network selector 2061 then registers the nomadic device in a client list within the information DB 208, generates a acknowledgement message, and delivers it to the message encoder 212. In addition, the network selector 2061 generates metadata including a Usecase and a request frame, and delivers them to the message encoder 212 for their transmission to the nomadic device. When the data frame from the nomadic device is received through the network interface 202, the network selector 2061 delivers the received data frame to the message decoder 2063 for decoding it.

The message decoder 2063 serves to convert the data frame provided from the network selector 2061 into a data type suitable for the situation determining unit 210, and stores the converted data frame in the information DB 208.

The information DB 208, stores the road condition information obtained from the sensor nodes 108, the client list in which the nomadic devices to be served are registered, data frames received from each nomadic device, the metadata including the Usecases of the local server, and multiple safety guidance messages corresponding to each situation of the nomadic device.

The situation determining unit 210 determines whether or not a situation happens in which the nomadic device is located at an intersection zone, a traffic light zone, a parking spot zone and the like through the device information from the nomadic device. When it is recognized that the situation happens, the situation determining unit 210 generates a safety guidance message corresponding the situation and delivers it to the message encoder 212. In case where the nomadic device is a vehicle-mounted terminal, the safety guidance message may include an intersection safety guidance message, a traffic guidance message, and a parking spot guidance message, as shown in FIG. 10, which may be represented to the user in visual and/or audible message.

In addition, the situation determining unit 210 checks whether or not there is a nomadic device which has not transmit its device information for a preset time period. When there is a nomadic device that has not transmit the device information for the preset time period, the situation determining unit 210 recognizes that the nomadic device is out of the service area 104 of the local server 102 and deletes the terminal ID of the nomadic device from the client list.

The message encoder 212 serves to encode the acknowledgement message, the metadata, and the request frame selectively provided from the network selector 2061 and the safety guidance message provided from the situation determining unit 210 into a format suitable to be used by the nomadic device, and to deliver the same to the client unit 214.

Lastly, the client unit 214 maintains a connection to the nomadic device and sequence status information, and delivers every encoded information and message to the network interface 202 for the transmission thereof to the nomadic device.

Figure 3:
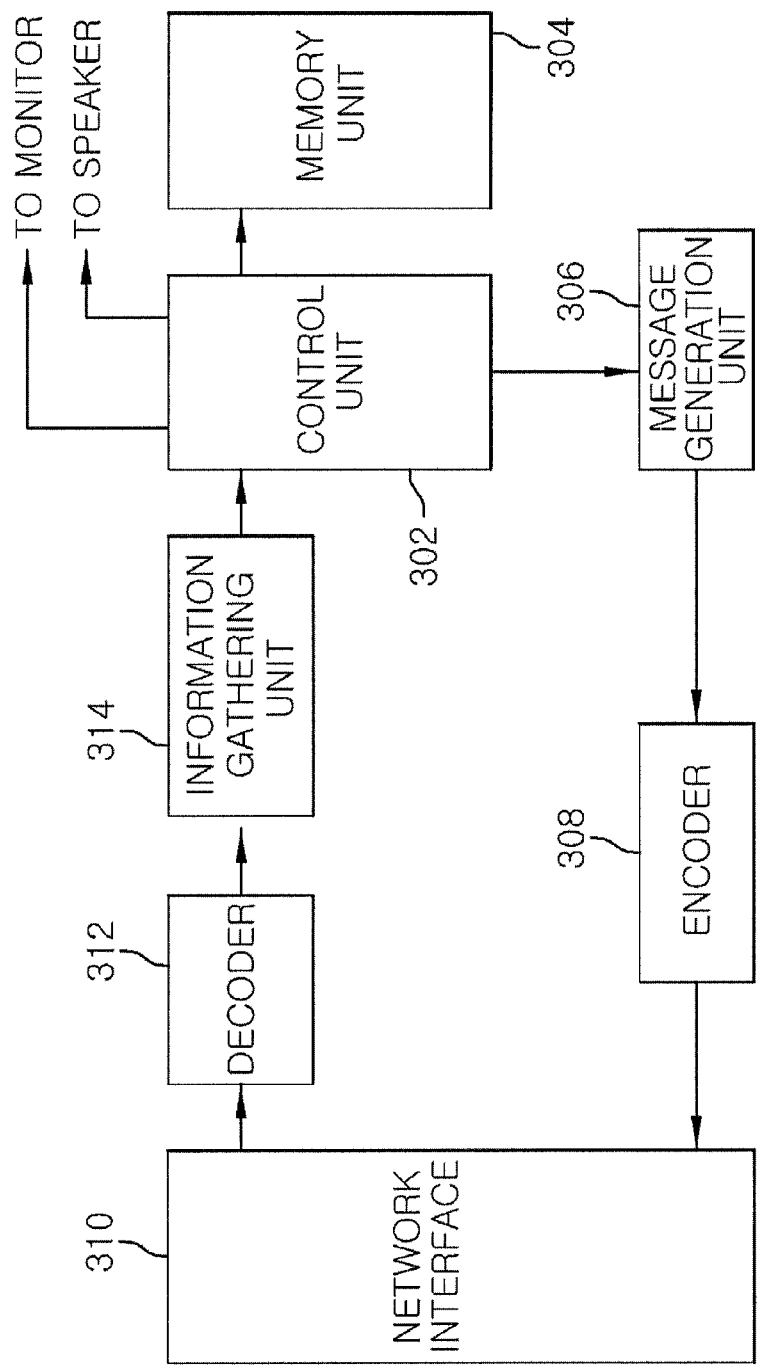
FIG. 3 illustrates a detailed block diagram of each nomadic device shown in FIG. 1 in accordance with an embodiment of the present invention.

FIG. 3 illustrates a detailed block diagram of the nomadic device shown in FIG. 1. As shown in FIG. 3, the nomadic device includes a control unit 302, a memory unit 304, a message generation unit 306, an encoder 308, a network interface 310, a decoder 312, and an information gathering unit 314.

The control unit 302, which may be implemented with a microprocessor or a microcontroller, retrieves the terminal ID or a current location from the memory unit 304 and allows the message generation unit 306 to generate an entry notification message in order to attempt a connection to the local server 102 when entering the service area 104 of the local server 102. Further, the control unit 302 receives an acknowledgement message, metadata, a request frame, and a safety guidance message from the local server 102 and controls the operations of the nomadic device correspondingly. Here, the current location may be location information or coordinate information received from a remote GPS satellite through a GPS receiver.

In addition, when the metadata containing a Usecase is received, the control unit 302 stores it in the memory unit 302. When a request frame requested by the local server 102 is received, the control unit 302 instructs the message generation unit 306 to generate a data frame including Usecases, and when there is no request frame from the local server 102 for a preset time period, namely, when it is recognized that the nomadic device is out of the service area of the corresponding local server, the control unit 302 deletes the metadata stored in the memory unit 304.

The memory unit 304 stores the device information such as a terminal ID, a current location, a driving speed and a travelling direction, and the metadata including the Usecase.

Also, when the safety guidance message is input from the information gathering unit 314, the control unit 302 provides an image or voice guidance message to a driver in order to guide the driver.

The message generation unit 306, under the control of the control unit 302, generates the entry notification message containing the terminal ID and the current location and delivers the entry notification message to the encoder 308. Also, the message generation unit 306 generates a data frame containing the terminal ID, the current location, the driving speed and the travelling direction in response to the request frame from the local server 102 and delivers it to the encoder 308.

The encoder 308 serves to encode the entry notification message and the data frame into a format suitable to be used by the local server 102, and deliver the same to the network interface 310 so as to wirelessly transmit to the local server.

The network interface 310 wirelessly transmits the entry notification message and the data frame to the local server 102, and receives the acknowledgement message, the metadata and the request frame from the local server 102.

The decoder 312 decodes the acknowledgement message, the metadata including the Usecase, and the request frame from the local server 102 into a data type suitable to be used by the nomadic device.

Figure 4:
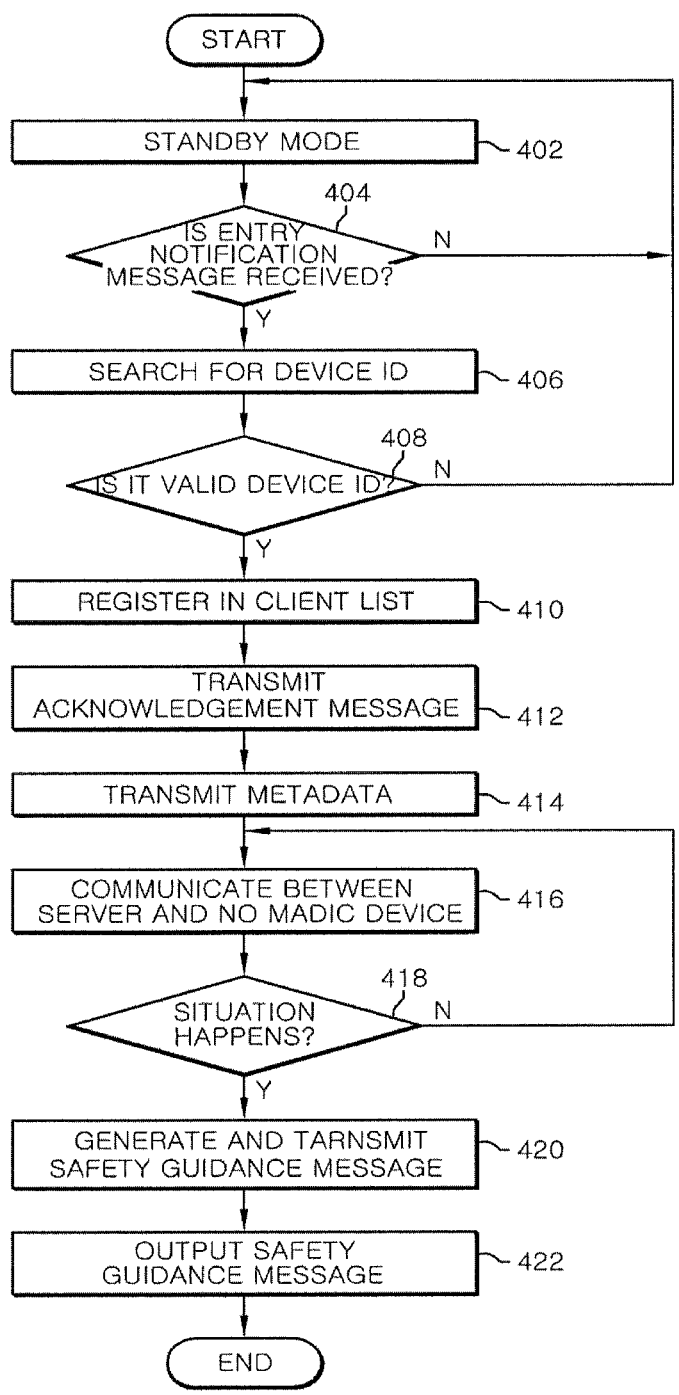
FIG. 4 is a flowchart illustrating a process for providing a safety guidance service to nomadic devices entering a service area in accordance with an embodiment of the present invention.

The information gathering unit 314 gathers the acknowledgement message, the metadata, and the request frame via the decoder 312, and delivers them to the control unit 302. FIG. 4 is a flowchart illustrating a process of providing a safety guidance service by a local server to the nomadic devices entering a service area of the local server in accordance with an embodiment of the present invention.

As shown in FIG. 4, when the local server 102 is in a standby mode or a service mode for a nomadic device, e.g., a nomadic device 106/2, a nomadic device, e.g., 160/1 approaching the service area 104 transmits an entry notification message including a terminal ID and current location in step 402. When the nomadic device 106/2 enters the service area 104, the local server 102 receives the entry notification message in step 404.

Next, the local server 102 extracts the terminal ID included in the entry notification message and searches the information DB 208 in step 406 to determine whether or not the terminal ID is a valid terminal ID in step 408.

As a result of step 408, if the terminal ID is determined to be a valid terminal ID, the local server 102 registers the nomadic device 106/1 in the client list within the information DB 208 in step 410, and then transmits an acknowledgement message to the nomadic device 106/1 in step 412. Subsequently, the local server 102 retrieves metadata including a Usecase from the information DB 208 and wirelessly transmits it to the nomadic device in step 414.

Thereafter, the local server 102 and the nomadic device communicate to exchange a request frame and a data frame in step 416. During the communication, the local server 102 determines where or not there is a situation in which the nomadic device is located at an intersection zone, a traffic light zone, a parking spot zone or the like based on the device information in the data frame received from the nomadic device in step 418. As a result of step 418, when it is determined that such a situation happens, the local server 102 generates a safety guidance message, e.g., a intersection safety guidance message, a traffic signal safety guidance message, a parking spot guidance message, and the like corresponding to the situation of the nomadic device. Next, the local server 102 then transmits the safety guidance message to the nomadic device in step 420. Here, the safety guidance message may be transmitted to a single nomadic device or may be simultaneously broadcasted to multiple nomadic devices related to the situation. Such a safety guidance message may include an image guidance information and/or voice guidance information.

As a result, the safety guidance message is delivered to a vehicle driver or a user held the nomadic device in step 422. Accordingly, the vehicle driver of the nomadic device can be safely guided pursuant to the safety guidance message.

Thereafter, as explained above, the local server 102 check the device information of the nomadic device registered in the client list at certain time intervals. Upon checking, if there is a nomadic device from which the device information has not been received for a preset time period, the local server 102 recognizes that the nomadic device is out of the service area 104 and performs a process of disconnecting the nomadic device and deleting its registration from the client list stored in the information DB 208.

Although the embodiments of the present invention has been described with respect to a case in which the nomadic device is assumed to be a vehicle-mounted nomadic device, if the nomadic device is a nomadic device carried by a pedestrian, the present invention may provide a safety guidance service in, e.g., a school zone, a crosswalk zone or the like.

In accordance with the present invention, a nomadic device transmits its ID and current location to a local server in order to notify of its entry at the beginning of entering a road associated with various safety accidents, and the local server dynamically generates a protocol sequence and a message itself based on a Usecase and transmits a sequence message in which a dynamically changeable message sequence and a format are defined to the nomadic device, so that the nomadic device can interpret messages to be exchanged with the local server later depending on the sequence message. Thus, because the messages of a defined format are exchanged depending on the defined order and the contents of the messages are recognized depending on a defined method, the nomadic device does not need to retain a program for interpreting various Usecases.

In addition, in accordance with the present invention, in a service area in which Usecases are different, a protocol can be extended or reduced and the Usecase is interpreted based on the message exchange sequence in the extended or reduced protocol, thus allowing a local server and a nomadic device to smoothly exchange messages, and even when a sequence is changed due to the change in a Usecase, there is no need to re-program.

Moreover, in accordance with the present invention, a means for configuring a protocol message by defining the primitive data elements is provided, and method and the system of the invention can ensure safety over accidents in a situation in which the visual field of a driver and/or a pedestrian is limited.

While the invention has been shown and described with respect to the particular embodiments, it will be understood by those skilled in the art that various changes and modification may be made without departing the scope of the present invention as defined the following claims.

What is claimed is:

1. A method for providing a safety guidance service from a local server to a nomadic device, the method comprising:
   gathering information regarding surrounding conditions within a service area on a road;
   receiving device information from the nomadic device, which enters the service area;
   determining whether or not the nomadic device is placed in a situation in which a visual field of a driver or a pedestrian is limited based on the device information;
   when it is recognized that the situation has happened, providing a safety guidance message suitable to the situation to the nomadic device; and
   transmitting metadata including an Usecase to the nomadic device for exchanging messages between the local server and the nomadic device.

2. The method of claim 1, wherein messages in the Usecase includes with types and numbers of primitive data elements to be included in the messages.

3. The method of claim 2, wherein the Usecase is expressed using an extensible markup language (XML) and is described using a document type definition (DTD).

4. The method of claim 1, further comprising:
   checking a terminal ID included in the device information received from the nomadic device; and
   registering the nomadic device as a served device when the terminal ID is a valid terminal ID in the local server.

5. The method of claim 1, wherein the nomadic device is one of a vehicle-mounted terminal or a pedestrian-carried mobile terminal.

6. The method of claim 5, wherein the device information includes a terminal ID, a location, a speed, and a direction of the nomadic device.

7. The method of claim 5, wherein the situation includes that the nomadic device is located at one of an intersection zone, a signal traffic zone, and a parking spot zone, and wherein the safety guidance message includes one of an intersection safety guidance message, traffic signal safety guidance message, and a parking spot safety guidance message.

8. The method of claim 1, further comprising:
   removing the terminal ID of the nomadic device from the local server when there is no reception of the device information from the nomadic device for a preset time period.

9. The method of claim 1, wherein the device information and the safety guidance message are in a binary format by using an XML message template.

10. A local server for providing a safety guidance service to a nomadic device, the local server comprising:
- an information gathering unit for gathering information regarding surrounding conditions within a service area on a road;
- a device information gathering unit for gathering device information of the nomadic device that enters the service area;
- an information database for storing the surrounding condition information and the device information of the nomadic device; and
- a situation determining unit for determining whether or not the nomadic device is placed in a situation in which a visual field of a driver or a pedestrian is limited based on the device information and when it is recognized that the situation has happened, providing a safety guidance message suitable to the situation to the nomadic device with reference to the surrounding condition information,
- wherein the device information gathering unit provides to the nomadic device metadata including a Usecase for exchanging messages between the local server and the nomadic device.

11. The local server of claim 10, wherein messages in the Usecase includes with types and numbers of primitive data elements to be included in the messages.

12. The local server of claim 10, wherein the Usecase is expressed using an extensible markup language (XML) and is described using a document type definition (DTD).

13. The local server of claim 10, wherein the situation includes that the nomadic device is located at one of an intersection zone, a signal traffic zone, and a parking spot zone, and the safety guidance message includes one of an intersection safety guidance message, traffic signal safety guidance message, and a parking spot safety guidance message.

14. A system for providing a safety guidance service comprising:
- a plurality of sensor nodes, each sensor node is installed in a service area on a road and acquires information about surrounding conditions within the service area;
- a nomadic device for providing device information thereof when entering the service area; and
- a local server for gathering the surrounding condition information and receiving the device information from the nomadic device, determining whether or not a situation happens in which a visual field of a driver or a pedestrian is limited based on the device information and when it is recognized that the situation has happened, transmitting a safety guidance message suitable to the situation to the nomadic device with reference to the surrounding condition information,
- wherein the local server provides to the nomadic device metadata including a Usecase for exchanging messages between the local server and the nomadic device.

15. The system of claim 14, wherein messages in the Usecase includes with types and numbers of primitive data elements to be included in the messages.

16. The system of claim 14, wherein the Usecase is expressed using an extensible markup language (XML) and is described using a document type definition (DTD).

17. The system of claim 14, wherein the situation includes that the nomadic device is located at one of an intersection zone, a signal traffic zone, and a parking spot zone, and the safety guidance message includes one of an intersection safety guidance message, traffic signal safety guidance message, and a parking spot safety guidance message.

* * * * *